Aug. 20, 1957 R. C. SANDERS, JR 2,803,788

ELECTRONIC MODULE

Filed Dec. 10, 1953

Royden C. Sanders, Jr.
*INVENTOR.*

BY

ATTORNEY 2,803,788

ELECTRONIC MODULE

Royden C. Sanders, Jr., Nashua, N. H., assignor to Sanders Associates, Incorporated, Nashua, N. H.

Application December 10, 1953, Serial No. 397,407

8 Claims. (Cl. 317—101)

This invention relates to electronic apparatus, its elements and components, and to the manufacture and assembly thereof.

The invention is especially useful in systems for mechanized production of electronic apparatus. It uses wafer and riser elements in structures known as modules. Circuit components assembled into such modules provide an extremely large variety of arrangements and are effectually building blocks of complete electronic devices. By their use high speed automatic production becomes feasible and precise and highly compact components are made available.

It is an object of the present invention to provide an improved module of the character described;

It is a further object of the invention to provide an improved module of the character described which is extremely light weight, of economical design, rugged construction and relatively easy to fabricate;

It is a further object of the invention to provide a module of the character described which is of novel design and construction and is especially adapted for manufacture by mass production methods;

Other and further objects of the invention will be apparent from the following detailed description of a typical embodiment thereof, taken in connection with the accompanying drawings.

In accordance with the present invention there is provided a composite electric component module. The module comprises a plurality of wafer elements preferably constructed of paper or paper-like material. A supporting means, preferably in the form of a one-piece paper or paper-like member, has a plurality of crimps engaging the edges of the wafer elements. Circuit components are carried by the wafer elements and electrically conductive paths are formed on the wafer elements and the side supporting means providing selective connections for the components. Thus, the supporting means, preferably comprising a single piece of paper, is folded in one direction to provide for the vertical sides of the module and is bent or crimped in a direction perpendicular to the fold to provide shelves which supportably engage the edges of the wafer elements.

Figure 1:
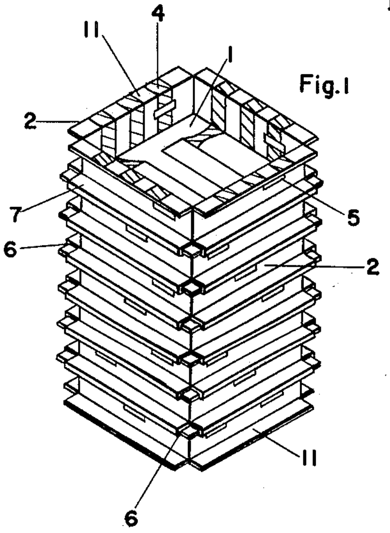
Fig. 1 is an isometric view of a composite electric-component module embodying the present invention.
Figure 2:
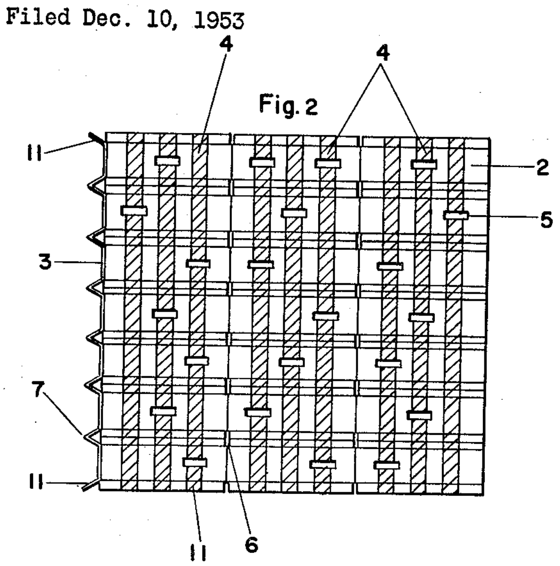
Fig. 2 is a side view of one of the supporting side members, prior to assembly, showing its side portions partially crimped and one side portion folded.

Referring now in more detail to the drawings, the cross-hatched areas illustrate conductive material. A typical module embodying the present invention is illustrated in Fig. 1. It comprises a group of wafer elements 1 supported and held in spaced relationship by the side member 2. In accordance with the present invention, both the wafer elements and side supporting member are constructed of paper or a suitable paper-like material. In Fig. 2 the side supporting member 2 is shown with one of its side portions 3 folded forwardly perpendicularly to its three remaining side portions, disclosing the inner surfaces thereof with the risers 4 thereon. Apertures 5 are provided in the riser member side providing breaks at desired places in the risers. Apertures 6 of the side member are provided to permit the insertion of the corners of the wafer elements 1.

Figure 3:
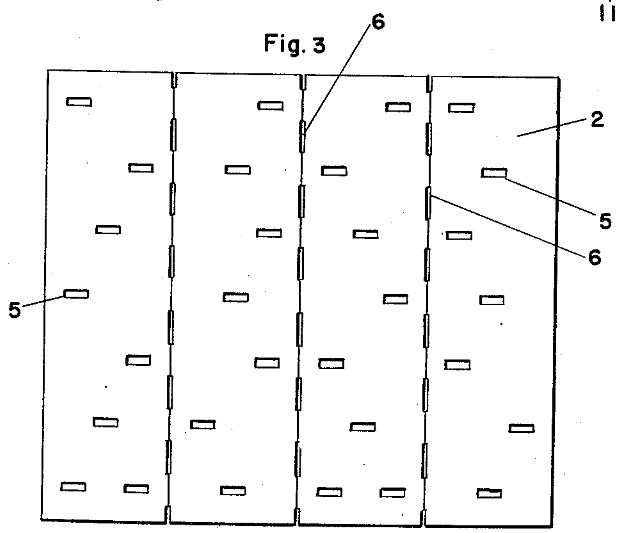
Fig. 3 is a side view of the supporting member showing the inner surface of all four side portions prior to folding.
Figure 4:
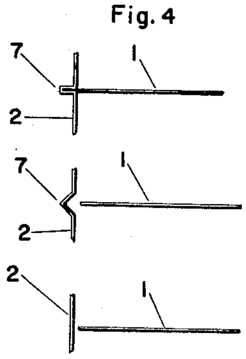
Fig. 4 illustrates three steps in the process of engaging an edge of a wafer element in the crimp of a side member.
Figure 5:
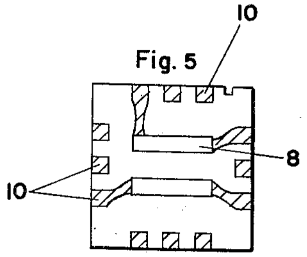
Fig. 5 is a plan view of a wafer element having resistors carried on the exposed surface.
Figure 6:
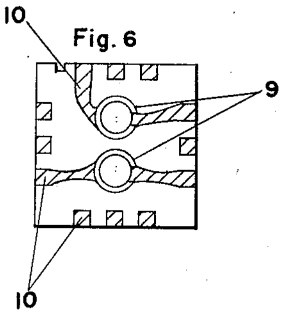
Fig. 6 is a view of the underside of the wafer element in Fig. 5 having capacitor elements on its exposed surface.

The inner surface of the side member 2 is shown in Fig. 2. It will be seen that there are provided for each wall of the module, three risers 4 which provide the electrical connections between the circuit components presently to be described. The risers consist of conductive material and are interrupted at predetermined places by the apertures 5 as mentioned above; the wafer elements carry circuit components. For example, resistors 8 are carried on the top surface of the wafer element illustrated in Fig. 5, and capacitors 9 on the underside of the element as indicated in Fig. 6. Conductive adhesive contacts 10 provide an electrical and mechanical connection between the wafer elements and their components and the risers 4. For the purpose of securing the module to another surface, there are provided extending edges 11 on the sides of the modules as shown, which may be secured by a suitable adhesive. In Fig. 4, from bottom up, are illustrated the three successive steps in applying the crimp to the edge of a water element and thereby providing supporting shelves 7. The flat side member 2, uncrimped as in Fig. 3, is shown at the bottom of Fig. 4 with an adjacent edge of wafer element 1. In the center of Fig. 4, the side member is shown partly crimped, as in Fig. 2. At the top of Fig. 4 the completed crimp, as in Fig. 1, is shown. As shown in Figs. 1, 2 and 3, the elongated apertures 6, provided in the side member, permit the crimping and folding of the module.

By virtue of the provision of the crimped paper module as described, there is provided an extremely effective building block for electronic devices. The unit in Fig 1 may be provided as a complete electronic system. A wafer may be added at the bottom carrying components and connections only on the top surface of the wafer. A second wafer, to which may be affixed a tube socket, may be added to the top of the unit in Fig. 1. Connections to the tube socket will be carried on the underside of the wafer. The outside surface of the completed unit constructed in the manner described would be entirely insulated electrically from the circuitry inside.

By use of such modules high speed, automatic production becomes feasible and practicable, and precise, light weight, highly compact, composite component assemblies, which are most economical in design, rugged in construction and relatively easy to fabricate, are made available.

While there has been hereinbefore described what is at present considered a preferred embodiment of the invention, it will be apparent to those skilled in the art that many and various changes and modifications may be made with respect to the embodiment illustrated without departing from the spirit of the invention. It will be understood, therefore, that all those changes and modifications as fall fairly within the scope of the appended claims are to be considered as a part of the present invention.

What is claimed is:

1. A composite electric component module comprising a plurality of wafer elements congruently stacked in spaced relation; a one-piece supporting means surrounding the edges of said elements having a plurality of crimps integrally formed with said supporting means and engaging said edges; circuit components carried by said wafer elements; and electrically conductive paths formed on said elements and said supporting means providing selective connections for said components.

2. A composite electric component module comprising a plurality of wafer elements; supporting means surrounding the edges of said elements, bent in one direction to provide side walls for said module and bent in a direction perpendicular to the first said direction to provide shelves engaging said edges of said wafer elements; circuit components carried by said wafer elements; and electrically conductive paths formed on said elements and said supporting means providing selective connections for said components.

3. A composite electric component module comprising a plurality of wafer elements; paper supporting means surrounding the edges of said elements bent in folds providing shelves engaging said edges; circuit components carried by said wafer elements; and electrically conductive paths formed on said elements and said supporting means providing selective connections for said components.

4. A composite electric component module comprising a plurality of wafer elements; a single piece of paper surrounding the edges of said elements and having bends in one direction to provide side walls for said module and folds perpendicular to said bends providing shelves supportably engaging edges of said wafer elements; circuit components carried by said wafer elements; and electrically conductive paths formed on said elements and said paper providing selective connections for said components.

5. A composite electric component module comprising a plurality of wafer elements congruently stacked in spaced relation; a one piece supporting means surrounding the edges of said elements having a plurality of crimps integrally formed with said supporting means and engaging said edges; circuit components carried by said wafer elements; and adhesive electrically conductive paths formed on said elements and said supporting means providing support for said wafer elements and selective connections for said components.

6. A composite electric component module comprising a plurality of wafer elements; a single sheet of paper-like material surrounding the edges of said elements and having bends in one direction to provide walls for said module and folds perpendicular to said bends supportably engaging said wafer elements with said folds cut away at said bends; circuit components carried by said wafer elements; and electrically conductive paths formed on said elements and said supporting means providing selective connections of said components.

7. A composite electrical component module comprising a plurality of wafer elements congruently stacked in spaced relation; a one piece supporting means surrounding the edges of said elements having a plurality of crimps integrally formed with said supporting means and engaging said edges; circuit components carried on the opposite surfaces of said wafer elements; and electrically conductive paths formed on the opposite sides of said elements and on the inner side of said supporting means providing selective connections for said components.

8. A composite, electrical-component module, comprising: a plurality of paper-like, wafer elements congruently stacked in spaced relation, each element having a plurality of conductive-adhesive contacts peripherally disposed; a single sheet of paper-like material having bends in one direction to provide walls for said modules and folds perpendicular to said bends supportably engaging said elements with said folds cut away at said bends; elongated, flat, riser conductors affixed to the inner surface of each of said walls and oriented parallel to said bends and so disposed as to coincide with said conductive-adhesive contacts on said wafer elements, said supporting means having slots formed therein extending through said riser conductors to provide a predetermined connection pattern with said riser conductors and said elements; circuit components carried by said wafer elements; and electrically conductive paths formed on said elements providing selective connections between said components and said riser conductors.

References Cited in the file of this patent

UNITED STATES PATENTS

| | | |
|---|---|---|
| 2,226,745 | Schrack | Dec. 31, 1940 |
| 2,262,791 | Bransford | Nov. 18, 1941 |
| 2,474,988 | Sargrove | July 5, 1949 |

FOREIGN PATENTS

| | | |
|---|---|---|
| 515,597 | Great Britain | Dec. 8, 1939 |

OTHER REFERENCES

All-Printed Circuit Electronic Assembly (4 pages). This is an article reprinted from Electrical Manufacturing, June 1953, page 152.

Tele-Tech and Electronic Industries, November 1953, pages 12, 70–72, 132–134.

Serial No. 397,677, Zodtner (A. P. C.), published May 18, 1943.